(12) United States Patent
Wang et al.

(10) Patent No.: US 11,850,819 B2
(45) Date of Patent: Dec. 26, 2023

(54) CONTROL METHOD FOR TRANSVERSE TO LONGITUDINAL CREASE STIFFNESS RATIO

(71) Applicant: ZHEJIANG MINONG CENTURY GROUP CO., LTD, Zhejiang (CN)

(72) Inventors: Ke Wang, Zhejiang (CN); Zhengrong Mo, Zhejiang (CN)

(73) Assignee: ZHEJIANG MINONG CENTURY GROUP CO., LTD, Zhejiang (CN)

( * ) Notice: Subject to any disclaimer, the term of this patent is extended or adjusted under 35 U.S.C. 154(b) by 199 days.

(21) Appl. No.: 17/431,722

(22) PCT Filed: Dec. 9, 2020

(86) PCT No.: PCT/CN2020/134721
§ 371 (c)(1),
(2) Date: Aug. 18, 2021

(87) PCT Pub. No.: WO2021/135866
PCT Pub. Date: Jul. 8, 2021

(65) Prior Publication Data
US 2021/0379857 A1    Dec. 9, 2021

(30) Foreign Application Priority Data
Dec. 31, 2019 (CN) .......................... 201911425806.4

(51) Int. Cl.
*B31B 50/00* (2017.01)
*B31B 50/20* (2017.01)
(Continued)

(52) U.S. Cl.
CPC ............ *B31B 50/006* (2017.08); *B31B 50/20* (2017.08); *B31B 50/26* (2017.08); *B31B 2100/00* (2017.08)

(58) Field of Classification Search
CPC ....... B31B 50/006; B31B 50/20; B31B 50/26; B31B 50/48; B31B 50/59; B31B 50/592; B31B 2100/00
See application file for complete search history.

(56) References Cited

U.S. PATENT DOCUMENTS

| | | | |
|---|---|---|---|
| 4,578,052 A * | 3/1986 | Engel ..................... | B65H 43/04 493/417 |
| 11,047,783 B2 * | 6/2021 | Lee .......................... | G01N 3/04 |

(Continued)

FOREIGN PATENT DOCUMENTS

| | | |
|---|---|---|
| CN | 101602422 | 12/2009 |
| CN | 102294871 | 12/2011 |

(Continued)

OTHER PUBLICATIONS

"International Search Report (Form PCT/ISA/210) of PCT/CN2020/134721", dated Feb. 20, 2021, with English translation thereof, pp. 1-6.

(Continued)

*Primary Examiner* — Sameh Tawfik
(74) *Attorney, Agent, or Firm* — JCIP GLOBAL INC.

(57) ABSTRACT

Disclosed is a control method for a transverse to longitudinal crease stiffness ratio, belonging to the packaging field. The transverse to longitudinal crease stiffness ratio represents the ratio of a transverse crease stiffness to a longitudinal crease stiffness, and the transverse to longitudinal crease stiffness ratio is controlled to be ≤1.25. The control method of the transverse to longitudinal crease stiffness ratio in the present invention enables to control the transverse to longitudinal crease stiffness ratio within a certain range by adjusting the height of a die-cutter or adjusting the width of a bottom die.

9 Claims, 2 Drawing Sheets

(51) Int. Cl.
*B31B 50/26* (2017.01)
*B31B 100/00* (2017.01)

(56) References Cited

U.S. PATENT DOCUMENTS

| | | | | |
|---|---|---|---|---|
| 2012/0208686 A1* | 8/2012 | Iwasa | ........................ | B65B 7/20 493/162 |
| 2015/0290897 A1* | 10/2015 | Le Monnier | ......... | B31D 5/0086 493/391 |
| 2017/0129639 A1* | 5/2017 | Carden | .................... | B65D 5/22 |
| 2018/0186541 A1* | 7/2018 | Jones | .................... | B31B 50/262 |

FOREIGN PATENT DOCUMENTS

| | | |
|---|---|---|
| CN | 102320416 | 1/2012 |
| CN | 104309259 | 1/2015 |
| CN | 108357749 | 8/2018 |
| CN | 209673565 | 11/2019 |
| CN | 110978617 | 4/2020 |
| JP | 2001240085 | 9/2001 |

OTHER PUBLICATIONS

"Written Opinion of the International Searching Authority (Form PCT/ISA/237) of PCT/CN2020/134721", dated Feb. 20, 2021, pp. 1-6.

* cited by examiner

CONTROL METHOD FOR TRANSVERSE TO LONGITUDINAL CREASE STIFFNESS RATIO

CROSS-REFERENCE TO RELATED APPLICATION

This application is a 371 of international application of PCT application serial no. PCT/CN2020/134721, filed on Dec. 9, 2020 which claims the priority benefit of China application no. 201911425806.4, filed on Dec. 31, 2019. The entirety of each of the above mentioned patent applications is hereby incorporated by reference herein and made a part of this specification.

BACKGROUND

Technical Field

The present invention relates to the packaging field, in particular relates to a control method for a transverse to longitudinal crease stiffness ratio.

Description of Related Art

A crease stiffness, generally represented by milliNewton (mN), refers to a resistance encountered when a paperboard is folded by some angle along a crease direction under certain conditions. No matter in manual folding or mechanical folding, the crease stiffness plays an important role in opening and closing a carton. An overhigh crease stiffness leads to displacement of a crease line from a finally set position in a carton forming production line or during carton design, and rebound of a crease gives rise to a larger force required to open a carton or distortion and pop-open of a formed carton, thereby lowering production quality and production efficiency. A transverse crease stiffness represents a crease stiffness in the direction vertical to a paper fiber direction, while a longitudinal crease stiffness represents a crease stiffness in the direction parallel to the paper fiber direction. A too large or small transverse to longitudinal crease stiffness ratio certainly causes paper jam or paper forming distortion, which is adverse to automatic packaging and loading of cartons. The transverse or longitudinal stiffness ratio of a paperboard is used for not only judging whether quality of the paperboard is up to standard, but also serving as a reference in adjustment of parameters of a die-cutter in paperboard processing.

SUMMARY

In order to resolve the above problems in the prior art, the present invention provides a method for a transverse to longitudinal crease stiffness ratio. The transverse to longitudinal crease stiffness ratio x represents a ratio of a transverse crease stiffness to a longitudinal crease stiffness, i.e., the transverse to longitudinal crease stiffness ratio x, and x=a transverse crease stiffness/a longitudinal crease stiffness, and the transverse to longitudinal crease stiffness ratio is controlled to be $1.00 \leq x \leq 1.25$.

Further, the transverse to longitudinal crease stiffness ratio is preferably $1.00 \leq x \leq 1.20$, more preferably $1.00 \leq x \leq 1.15$, and most preferably $1.00 \leq x \leq 1.10$.

Further, a crease depth is adjusted by changing a height of a die-cutter or a die cutting pressure so as to control the transverse to longitudinal crease stiffness ratio.

Further, a width of a bottom groove is adjusted by replacing a bottom die groove so as to control the transverse to longitudinal crease stiffness ratio.

Further, the transverse to longitudinal crease stiffness ratio is tested by the following steps:
1) cutting out a group of samples from a carton, wherein said samples includes transverse stiffness samples and longitudinal stiffness samples;
2) inserting a sample of the group of samples into a rotary clamp of a stiffness tester, and firmly clamping the sample;
3) starting the stiffness tester, rotating the rotary clamp, quickly folding the sample at a crease by 90°, and simultaneously starting a timer;
4) after keeping the sample folded for a period of time, testing a force required to keep the sample folded by 90° via the stiffness tester;
5) repeating the above four steps on the rest samples of the group of samples so as to respectively obtain a transverse stiffness and a longitudinal stiffness of each sample;
6) respectively calculating an average value and a standard deviation of longitudinal and transverse readings of each sample to obtain a crease stiffness of the carton; and
7) calculating the ratio of the transverse stiffness to the longitudinal stiffness of each sample.

Further, a width of the samples is in a range from 37.9 to 38.3 mm, a distance between a crease line to a cutting edge of the samples is in a range from 24.8 to 25.2 mm, a length of the crease line is not less than 36 mm, and the cut samples have straight, smooth and neat edges without breakage.

Further, a thickness of the samples is in a range from 200 to 1000 μm.

Further, prior to testing, a to-be-tested sample needs to be pretreated at a temperature of 23° C. and a humidity of 50% RH.

According to the control method for a transverse to longitudinal crease stiffness ratio, the transverse to longitudinal stiffness ratios of paper packaging products processed by different ways are controlled within a certain range based on different categories, thus ensuring high packaging production efficiency and good packaging effect of packaged products when loaded, avoiding defects of packing boxes in appearance, such as distortion, deflection or the like in packaging formation, and ensuring less production loss in packaging.

DESCRIPTION OF THE EMBODIMENTS

The present invention will be further explained in conjunction with the following drawings.

Figure 1:
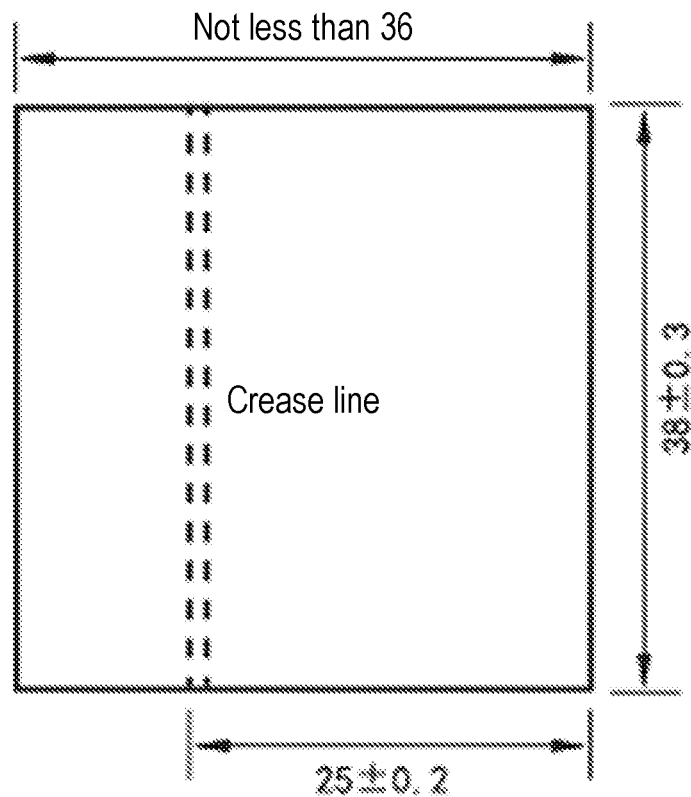
FIG. 1 is a schematic drawing of a to-be-tested sample of the present invention.
Figure 2:
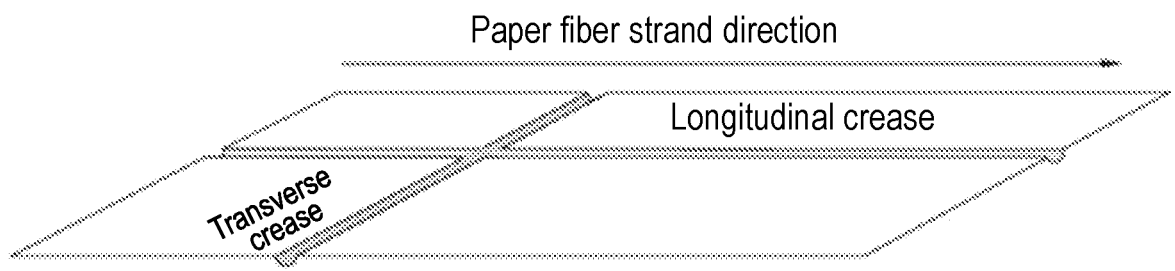
FIG. 2 is a schematically structural drawing of the to-be-tested sample of the present invention.

As shown in FIGS. 1 and 2, the method for testing a crease stiffness of a carton comprises the following steps. Samples are prepared first, to be specific, a sample is cut out from a carton along the direction of a crease line, wherein a crease is neither bended nor smoothened in sample cutting; the length of the crease line of the sample is 38±0.3 mm. A paper sheet at one side of the crease line is about 15 mm wide, and about 30 mm wide at the other side (see FIG. 3). The sample is cut once again (see FIG. 2) so as to ensure the distance between the crease line and a cutting edge is 25±0.2 mm, and ensure a resistance measurement distance at 25 mm during folding along the crease line. According to the above method, at least five longitudinal samples with their crease lines parallel to the paper direction and five transverse samples with their crease lines vertical to the paper direction are prepared.

Prior to testing, the samples are pretreated at a temperature of 23° C. and a humidity of 50% RH, then one of the prepared samples is inserted into the clamp of a stiffness tester and installed in place, then quickly folded by 90° at a crease within 1 s by rotating the clamp. Meantime, a timer is started, and after 15±0.2 s, a force required to keep the sample folded by 90° is recorded, (note: a measurement value declines when the sample is refolded by 90° at the crease), the above processes are repeated on the rest samples, and transverse longitudinal stiffness and longitudinal stiffness of each sample respectively measured.

Based on the stiffness measured by the stiffness tester, the average value and standard deviation of the longitudinal crease stiffness and transverse crease stiffness of each sample are respectively calculated. The crease stiffness is represented by milliNewton (mN), with three significant digits reserved, or one decimal place is reserved at a proper condition. For an instrument corrected by a gram force, its result represented by milliNewton, can be calculated through multiplying 9.81 by a gram force value.

Figure 3:
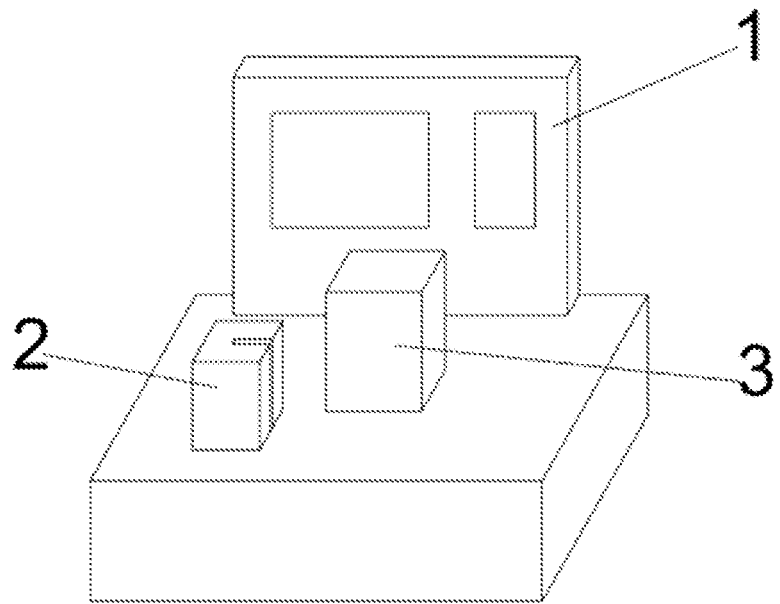
FIG. 3 is a schematic drawing of crease stiffness detection of the present invention.

As shown in FIG. 3, the crease stiffness tester is a testing device of a two-point loading method, and it can apply a force at a certain rate, ensure that a tested sample is bent when folded by 90° and record the force value. A testing system of the crease stiffness tester is capable of continuously recording data and displaying an acting force-time curve. A force measuring system is capable of displaying a value as precious as to ±1% or ±0.1 N of a reading, with a more precious value being preferred.

The crease stiffness tester needs to meet the following requirements. The bending angle of a sample is 90±0.5°. The bending length of the sample is 10±0.2 mm. The clamping depth of the sample is 22±0.2 mm. The clamping width of the sample is 38±0.3 mm. The distance between a clamping opening of the clamp and a rotary shaft is 3±0.2 mm. The precision of a pressure sensor is at least 2%.

Figure 4:
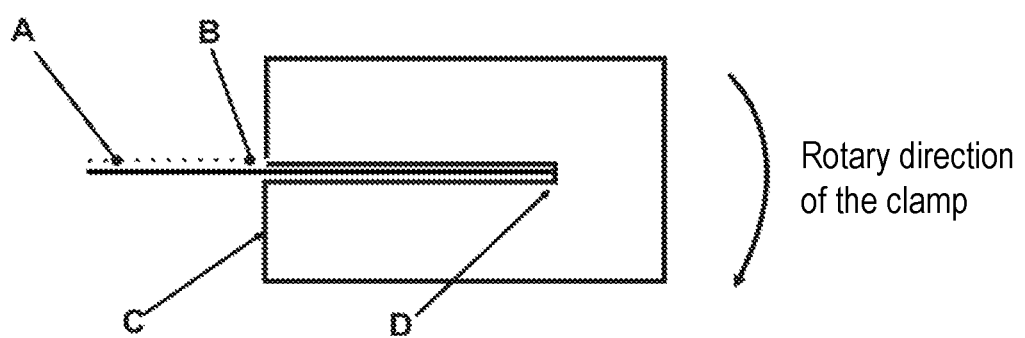
FIG. 4 is a schematic drawing of the crease stiffness detection of the present invention.

As shown in FIG. 4, A represents the position of a measuring point, B represents the position of a measuring shaft, C represents a clamping face, D represents a clamping root portion, and they all meet the conditions: A to B=10±0.2 mm; B to C=3±0.2 mm; C to D=22±0.2 mm.

The prepared samples meet the following requirements: a stiffness sampler is used to repeatedly cut out such a sample that a width is 38±0.3 mm, a distance between a crease line and one cutting edge is 25±0.2 mm, and a length is not less than 36 mm, and the included angle between the sample and the crease line is 90±1°. Besides, the cut samples have straight, smooth and neat edges without breakage.

The size of a sample is 36 mm×38 mm (length×width). The sample is cut out from a carton along the direction of a crease line in preparation, wherein a crease is neither bended nor smoothened. The width of the crease line of the sample is 38±0.3 mm. A paper sheet at one side of the crease line is about 15 mm long, and about 30 mm long at the other side. The sample is cut out once again so as to ensure the distance between the crease line and a cutting edge is 25±0.2 mm, and ensure a resistance measurement distance at 25 mm during folding along the crease line.

The measured transverse crease stiffness is divided by a longitudinal crease stiffness to obtain a transverse to longitudinal crease stiffness ratio. The formula is as follows.

A transverse to longitudinal crease stiffness ratio (x) is calculated by the formula: x=a transverse crease stiffness/a longitudinal crease stiffness.

The transverse to longitudinal crease stiffness ratio represents a ratio of a transverse crease stiffness to a longitudinal crease stiffness, wherein the transverse to longitudinal crease stiffness ratio is $1.00 \leq x \leq 1.25$, preferably $1.00 \leq x \leq 1.20$, more preferably $1.00 \leq x \leq 1.15$, and most preferably $1.00 \leq x \leq 1.10$.

Table 1 shows crease stiffness ratio control recommendation values of cartons commonly used by corresponding paper.

| Paper grade | Category divided by intervals | Transverse crease stiffness mN | Longitudinal crease stiffness mN | Transverse to longitudinal crease stiffness ratio (x) |
| --- | --- | --- | --- | --- |
| ivory board | ≤200 g/m² | ≤400 | ≤380 | ≤1.10 |
| aluminum/dielectric-plated paper | ≤200 g/m² | ≤450 | ≤430 | ≤1.10 |
| composite paper | ≤200 g/m² | ≤680 | ≤600 | ≤1.20 |
| ivory board | ≤250 g/m² | ≤550 | ≤500 | ≤1.15 |
| aluminum/dielectric-plated paper | ≤250 g/m² | ≤680 | ≤600 | ≤1.20 |
| composite paper | ≤250 g/m² | ≤750 | ≤680 | ≤1.25 |
| ivory board | ≤300 g/m² | ≤580 | ≤530 | ≤1.15 |
| aluminum/dielectric-plated paper | ≤300 g/m² | ≤680 | ≤600 | ≤1.20 |
| | ≤300 g/m² | ≤780 | ≤710 | ≤1.25 |
| composite paper ivory board | ≤350 g/m² | ≤610 | ≤560 | ≤1.15 |
| aluminum/dielectric-plated paper | ≤350 g/m² | ≤710 | ≤630 | ≤1.20 |
| composite paper | ≤350 g/m² | ≤810 | ≤740 | ≤1.25 |
| coated paper | ≤360 g/m² | ≤1400 | ≤1350 | ≤1.15 |

If the transverse to longitudinal crease stiffness ratio does not meet the above conditions, it can be adjusted by changing the crease depth or the width of a bottom groove of paper in the cutting or creasing process. A deeper crease and a narrower bottom groove result in a smaller crease stiffness. The crease depth is adjusted by changing the height of a die cutter or a die cutting pressure, and the width of the bottom groove is adjusted by replacing a bottom die groove.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A control method for a transverse to longitudinal crease stiffness ratio, wherein the transverse to longitudinal crease stiffness ratio x represents a ratio of a transverse crease stiffness to a longitudinal crease stiffness, and x=a transverse crease stiffness/a longitudinal crease stiffness, and the control method comprising controlling the transverse to longitudinal crease stiffness ratio to be 1.00≤x≤1.25, wherein the transverse to longitudinal crease stiffness ratio is tested by the following steps:

step 1: cutting out a group of samples from a carton, wherein said samples includes transverse stiffness samples and longitudinal stiffness samples;

step 2: inserting a sample of the group of samples into a rotary clamp of a stiffness tester, and firmly clamping the sample;

step 3: starting the stiffness tester, rotating the rotary clamp, quickly folding the sample at a crease by 90°, and simultaneously starting a timer;

step 4: after keeping the sample folded for a period of time, testing a force required to keep the sample folded by 90° via the stiffness tester;

step 5: repeating the above steps 1-4 on the rest samples of the group of samples so as to respectively obtain a transverse stiffness and a longitudinal stiffness of each sample;

step 6: respectively calculating an average value and a standard deviation of longitudinal and transverse readings of each sample to obtain a crease stiffness of the carton; and step 7 calculating the ratio of the transverse stiffness to the longitudinal stiffness of each sample.

2. The control method for a transverse to longitudinal crease stiffness ratio according to claim 1, wherein the transverse to longitudinal crease stiffness ratio is 1.00≤x≤1.20 or 1.00≤x≤1.15 or 1.00≤x≤1.10.

3. The control method for a transverse to longitudinal crease stiffness ratio according to claim 2, wherein a crease depth is adjusted by changing a height of a die-cutter or a die cutting pressure so as to control the transverse to longitudinal crease stiffness ratio.

4. The control method for a transverse to longitudinal crease stiffness ratio according to claim 2, wherein a width of a bottom groove is adjusted by replacing a bottom die groove so as to control the transverse to longitudinal crease stiffness ratio.

5. The control method for a transverse to longitudinal crease stiffness ratio according to claim 1, wherein a width of each sample is in a range from 37.9 to 38.3 mm, a distance between a crease line to a cutting edge of each sample is in a range from 24.8 to 25.2 mm, a length of the crease line is not less than 36 mm, and the cut samples have straight, smooth and neat edges without breakage.

6. The control method for a transverse to longitudinal crease stiffness ratio according to claim 1, wherein a thickness of each sample is in a range from 200 to 1000 μm.

7. The control method for a transverse to longitudinal crease stiffness ratio according to claim 1, wherein prior to testing, a to-be-tested sample needs to be pretreated at a temperature of 23° C. and a humidity of 50% RH.

8. The control method for a transverse to longitudinal crease stiffness ratio according to claim 1, wherein a crease depth is adjusted by changing a height of a die-cutter or a die cutting pressure so as to control the transverse to longitudinal crease stiffness ratio.

9. The control method for a transverse to longitudinal crease stiffness ratio according to claim 1, wherein a width of a bottom groove is adjusted by replacing a bottom die groove, wherein to control the transverse to longitudinal crease stiffness ratio.

\* \* \* \* \*